US012323198B2

(12) United States Patent
Wijaya et al.

(10) Patent No.: US 12,323,198 B2
(45) Date of Patent: Jun. 3, 2025

(54) SYSTEM AND METHOD FOR POWER LINE COMMUNICATION (PLC) SIGNAL DATA BODY ENCODING USING DIFFERENTIAL PHASE DETECTION

(71) Applicant: Bendix Commercial Vehicle Systems LLC, Avon, OH (US)

(72) Inventors: Tandi Wijaya, Highland Heights, OH (US); Pratima Vishwakarma, Maharashtra (IN); Michael Cremona, Lakewood, OH (US); Mangesh Bhaginath Dhakane, Maharashtra (IN); Kritika Singhvi, Elyria, OH (US); Khoi Dang, Avon Lake, OH (US); Amit B. Nahar, Maharashtra (IN); Thomas Hayes, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 136 days.

(21) Appl. No.: 18/071,915

(22) Filed: Nov. 30, 2022

(65) Prior Publication Data

US 2024/0178881 A1   May 30, 2024

(51) Int. Cl.
*H04B 3/54* (2006.01)
*H04B 3/462* (2015.01)

(52) U.S. Cl.
CPC ............. *H04B 3/54* (2013.01); *H04B 3/462* (2013.01)

(58) Field of Classification Search
CPC .................................. H04B 3/462; H04B 3/54
See application file for complete search history.

(56) References Cited

U.S. PATENT DOCUMENTS

| 5,739,592 | A | 4/1998 | Rigsby et al. |
| 6,067,325 | A * | 5/2000 | Carter, IV ........... H04L 27/2331 375/330 |
| 8,276,996 | B2 | 10/2012 | Lesesky et al. |
| 8,737,555 | B2 | 5/2014 | Haug et al. |
| 8,792,567 | B2 * | 7/2014 | Dabak ..................... H04B 3/54 375/257 |
| 9,614,706 | B2 | 4/2017 | Downey |
| 10,050,674 | B1 | 8/2018 | Hayes et al. |
| 10,055,900 | B2 | 8/2018 | Zula |
| 2013/0128938 | A1* | 5/2013 | Yanagisawa .......... H04L 25/067 375/257 |
| 2013/0195208 | A1* | 8/2013 | Umehara ............ H04L 27/2032 375/257 |
| 2013/0301649 | A1* | 11/2013 | Vijayasankar ........ H04L 12/413 370/445 |

(Continued)

OTHER PUBLICATIONS

U.S. Appl. No. 17/578,813, filed Jan. 19, 2022 entitled "Variable PLC Signal Amplifier and Attenuator."

(Continued)

*Primary Examiner* — David S Huang
(74) *Attorney, Agent, or Firm* — Crowell & Moring LLP (57) ABSTRACT

A system and method are disclosed for power line communication (PLC) signal data body encoding using differential phase detection. In one embodiment, if a preamble section of the PLC signal is too noisy, instead of attempting to read the actual signal in a data section of the PLC signal, a differential phase detection circuit is used to detect a phase difference between two symbols in the data section, as phase detection is less susceptible to noise.

19 Claims, 6 Drawing Sheets

(56) References Cited

U.S. PATENT DOCUMENTS

| | | |
|---|---|---|
| 2022/0201826 A1 | 6/2022 | Tousignant Gendron et al. |
| 2023/0054729 A1 | 2/2023 | Vinci et al. |
| 2023/0069630 A1 | 3/2023 | Peacemaker et al. |
| 2023/0073417 A1 | 3/2023 | Sniegocki et al. |

OTHER PUBLICATIONS

U.S. Appl. No. 17/948,632, filed Sep. 20, 2022 entitled "Auto Calibrate PLC Signal Leveling."
U.S. Appl. No. 18/385,482, filed Oct. 31, 2023 entitled "Power Line Communication (PLC) Self-Test for Tractor-Trailers."
"SSCP485 Data Sheet"; Technical Data Sheet—SSC P485 PL Transceiver IC, Revision 5 (24000828); Intellon Corporation; Jul. 1998; 19 pages.
"32-bit AURIX™ TriCore™ Microcontroller"; product page; downloaded from the Internet on Jul. 1, 2024 at 32-bit AURIX™ TriCore™ Microcontroller—Infineon Technologies; Infineon Technologies AG; 2024; 71 Pages.
MBS-1P Installation Guide—Heavy Duty Trailer ABS by Wabash National; Wabash Technology Corp.; PGI57322-0403; Apr. 2003; 47 pages.

\* cited by examiner

SYSTEM AND METHOD FOR POWER LINE COMMUNICATION (PLC) SIGNAL DATA BODY ENCODING USING DIFFERENTIAL PHASE DETECTION

BACKGROUND

Power line communication (PLC) is a communication method in which data is transmitted over wires that are also used to deliver electric power. The data is encoded within a signal that is transmitted over the wires in frequency ranges outside of those used to transmit electric power. PLC is advantageous relative to other communication methods because it enables communication using existing wiring. Tractor-trailers frequently employ PLC to exchange messages between members of the tractor-trailer including, for example, sensor readings from vehicle systems including anti-lock braking systems, collision avoidance systems, tire pressure monitoring systems, and other vehicle systems, as well as commands used to control anti-lock braking systems, lighting systems, and other vehicle systems.

SUMMARY

The following embodiments generally relate to a system and method for power line Communication (PLC) signal data body encoding using differential phase detection. In one embodiment, a system is provided comprising a controller; circuitry coupled with the controller and configured to detect a data section of a power line communication (PLC) message, wherein the data section comprises a plurality of logic 0 and logic 1 symbols that are 180 degrees out-of-phase with each other, and a differential phase detection system coupled with the circuitry and the controller. The differential phase detection system is configured to: read phases of two adjacent symbols in the data section; determine whether a phase difference exists between the phases of the two adjacent symbols; and provide an output to the controller regarding whether the phase difference exists.

In another embodiment, a method is provided that is performed in a controller in a vehicle, the controller being in communication with at least one other controller in the vehicle via a power line. The method comprises: receiving, from first circuitry, a preamble section of a power line communication (PLC) message communicated on the power line; determining whether a noise level in the preamble section is greater than a threshold; and performing at least one of: in response to determining that the noise level in the preamble section is not greater than the threshold, receiving, from the first circuitry, a data section of the PLC message; and in response to determining that the noise level in the preamble section is greater than the threshold, instead of receiving the data section of the PLC message from the first circuitry, receiving differential phase information from second circuitry, wherein the differential phase information indicates whether two symbols in the PLC message are out-of-phase with each other.

In yet another embodiment, a system is provided comprising: means for determining whether a noise level in a preamble section of a power line communication (PLC) message communicated on a power line of a vehicle is greater than a threshold; and means for, in response to determining that the noise level is greater than the threshold, detecting phase differences in signal chirps in the data section.

Other embodiments are possible, and each of the embodiments can be used alone or together in combination.

DETAILED DESCRIPTION

Figure 1:
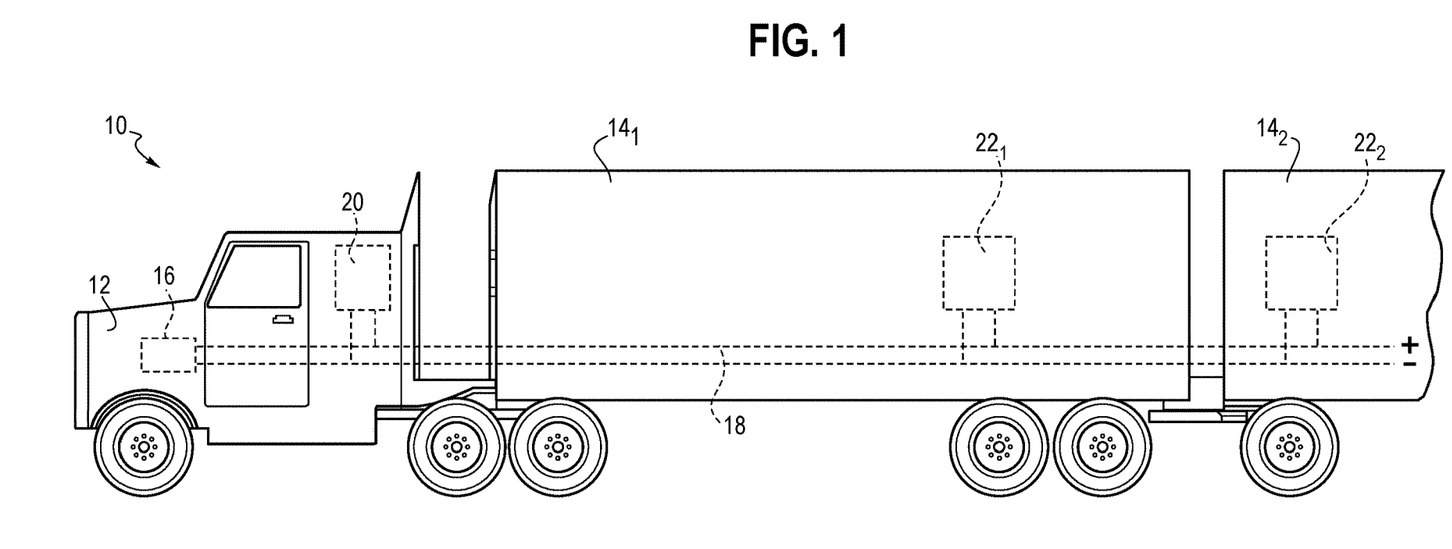
FIG. 1 is a diagram of a vehicle of an embodiment including a plurality of electronic systems communicating along a power line in the vehicle.

Turning now to the drawings, FIG. 1 illustrates a vehicle of an embodiment; in particular, a tractor-trailer 10. The tractor-trailer 10 (also referred to as a semi) contains a truck or tractor 12 and one or more trailers 141 . . . 14N. In this embodiment, the tractor 12 contains a power unit, such as an internal combustion engine, and steering and drive axles. The tractor 12 also contains a battery 16 for use in starting the power unit and in providing power to various accessory systems. Trailers 141 . . . 14N are provided to store freight and are detachably coupled to the tractor 12. Although a pair of trailers 14 is shown in the illustrated embodiment, it should be understood that fewer or more trailers can be used.

The tractor 12 and the trailers 14 may include various fluid and power lines that extend between the tractor 12 and the trailers 14, including power line 18. The fluid and power lines allow delivery of fluids and electrical power from the tractor 12 to the trailers 14 for use in, for example, tire pressure management, braking, and activation of tail lights on the trailer 14. The power line 18 is also used for power line communication (PLC) to transmit data over wires that are also used to deliver electric power. The data is encoded within a signal that is transmitted over the wires in frequency ranges outside of those used to transmit electric power. In this example, the power line 18 forms part of a network used to transmit communications between various electronic systems 20, 221 . . . 22N on the tractor 12 and the trailers 14, respectively. Systems 20, 22 may comprise any of a wide variety of systems commonly employed on a tractor-trailer 10 including, for example, anti-lock braking systems, collision avoidance systems, tire pressure monitoring and control systems, trailer load monitoring systems, and lighting systems. The power line 18 may enable transmission of data from one or more systems 22 on the trailers 14 to a system 20 on the tractor 12 including, for example, sensor readings indicative of the operation of an anti-lock braking system, the location of surrounding vehicles and infrastructure, pressure within the tires on the trailer 14, or a shift in the load carried by the trailer 14. The power line 18 may also enable transmission of commands and data from the tractor 12 to the trailers 14 for use in controlling elements of an anti-lock braking system, a tire pressure control system, or a lighting system on one or more of the trailers 14.

Figure 2:
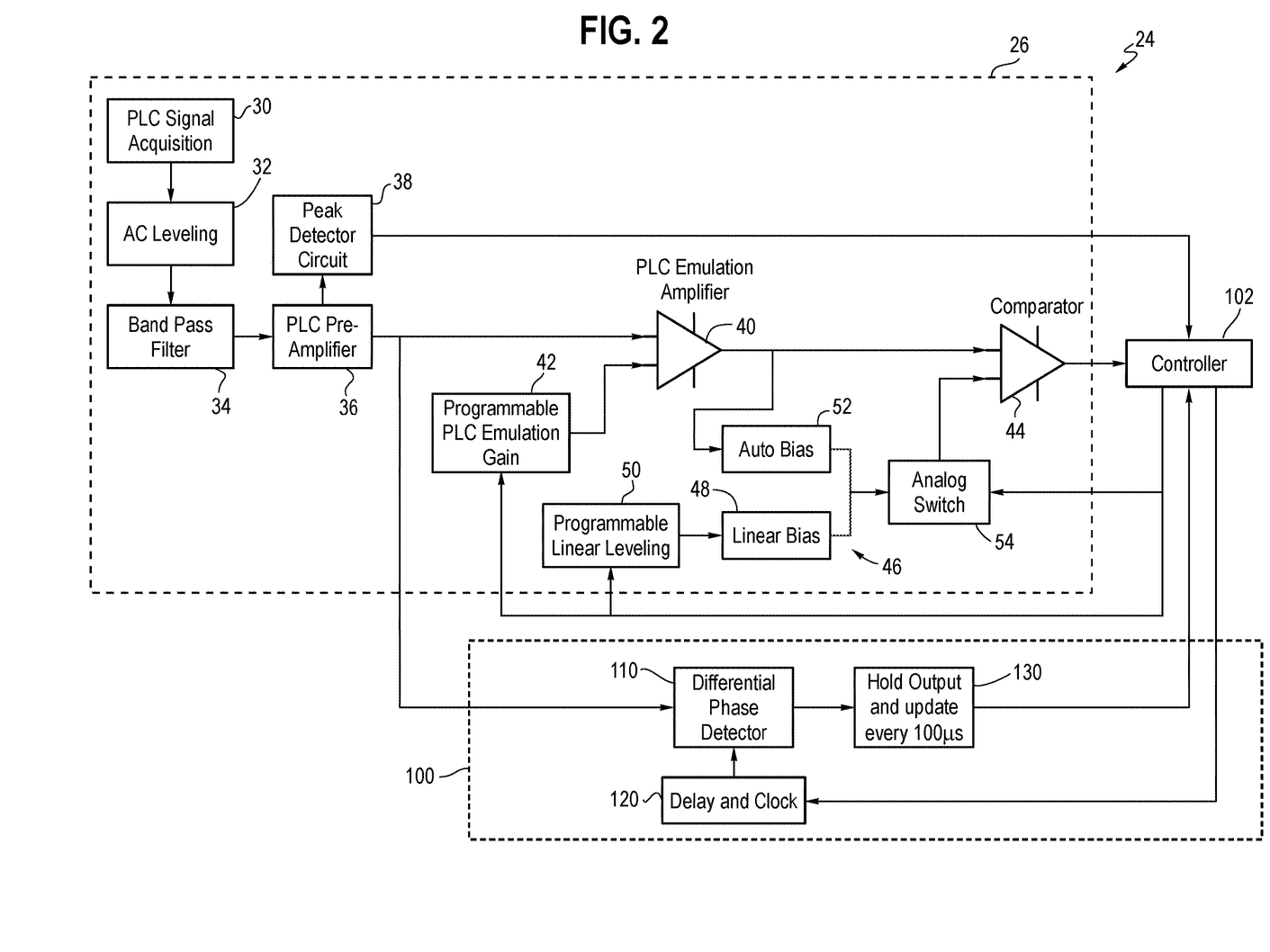
FIG. 2 is a diagram of a system of an embodiment for calibrating signals received over a power line within a vehicle.

Referring now to FIG. 2, each system 20, 22 may include a system 24 for calibrating signals received over the power line 18. The system 24 may include a signal conditioning circuit 26 and a controller 102. The signal conditioning circuit 26 is provided to condition signals received from the power line 18 for use by the controller 102 and, in particular, to convert analog input signals received over the power line 18 into digital input signals for the controller 102. Signals may be transmitted along the power line 18 at a frequency between 100-400 KHz using amplitude shift keying (ASK) or frequency shift keying (FSK) in accordance with a communication protocol developed by the Society of Automotive Engineers (SAE), as set forth in a document number J2497 and titled "Power Line Carrier Communications for Commercial Vehicles."

The circuit 26 may include a PLC signal acquisition circuit 30, an alternating current (AC) leveling circuit 32, a band-pass filter 34, a PLC pre-amplifier 36, a peak detector circuit 38, a PLC emulation amplifier 40, a programmable (adjustable) PLC emulation gain circuit 42, a comparator 44, and a bias circuit 46. The signal acquisition circuit 30 couples the signal conditioning circuit 26 to the power line 18. The circuit 30 may include a capacitor that couples the circuit 26 to the power line 18 and a clamping diode (e.g., a Zener diode) downstream of the capacitor. It should be understood that the circuit 30 may take various forms and may implement inductive coupling of the circuit 26 to the power line 18 rather than capacitive coupling. The AC leveling circuit 32 is provided to remove the direct current (DC) component of the signal received from the signal acquisition circuit 30 and center the alternating current (AC) component at about zero (0) Volts. The circuit 32 may include a capacitor.

The filter 34 is provided to prevent passage of analog input signals outside of certain frequencies (e.g., 100 KHz to 400 KHz). The filter 34 may be configured to prevent passage of signals that are not intended for the controller 102 and/or cannot be interpreted by the controller 102 and may prevent passage of signals subject to significant interference. The filter 34 may comprise a bandpass filter. The pre-amplifier 36 is provided to strengthen the analog input signal prior to delivery to the amplifier 40. The pre-amplifier 36 receives signals output by the bandpass filter 34 and transmits the signals to an input terminal of the amplifier 40. The peak detector circuit 38 identifies and measures amplitude peaks in the analog input signals. The circuit 38 generates signals indicative of the amplitude corresponding to each analog input signal responsive to signals generated by the pre-amplifier 36. The peak detector circuit 38 provides those signals to the controller 102.

The amplifier 40 is configured to output amplified signals that correspond to the analog input signals but have an increased amplitude. In accordance with one aspect of the disclosed embodiments, the gain applied by the amplifier 40 to the analog input signal varies depending on the amplifier gain signal received from the adjustable gain circuit 42. The amplifier 40 generates amplified signals responsive to the analog input signals (and, in particular, the signals received from the pre-amplifier 36) and the amplifier gain signal. The digital input signals provided to the controller 102 are then derived from the amplified signals. The adjustable gain circuit 42 is provided to vary the gain of the amplifier 40. The circuit 42 may comprise a digital potentiometer and may output an amplifier gain signal establishing an amplifier gain level for the amplifier 40. The configuration of the amplifier gain signal and, therefore, the amplifier gain level will vary responsive to an amplifier gain control signal received from the controller 102.

The comparator 44 is configured to generate the digital input signals provided to the controller 102 responsive to the analog input signals received over the power line 18 and, in particular, the amplified signals based on the analog input signals generated by the amplifier 40. The comparator 44 compares the amplified signals from the amplifier 40 against a bias signal generated by the bias circuit 46 that establishes a DC (direct current) bias level. The bias circuit 46 is provided to generate a bias signal establishing a bias level for use in biasing circuit elements within the comparator 44. The circuit 46 may be configured to vary the level and/or type of bias. The bias circuit 46 may include a linear bias circuit 48, a programmable (adjustable) linear leveling circuit 50, an auto-bias circuit 52, and an analog switch (a bias selection circuit) 54. The linear bias circuit 48 generates a linear bias signal having a preset bias level that is independent of the analog input signal and the amplified signal generated by the amplifier 40. The circuit 48 may comprise a voltage divider controlled by one or more digital potentiometers. The circuit 48 outputs the linear bias signal responsive to a linear leveling signal output by the adjustable linear leveling circuit 50.

The adjustable linear leveling circuit 50 generates a linear leveling signal configured to control the linear bias circuit 48 and the configuration of the linear bias signal and bias level. The circuit 50 may comprise a digital potentiometer connected to a reference voltage source (not shown) and may generate the linear leveling signal responsive to the control signal from the controller 102. The auto-bias circuit 52 generates an auto-bias signal having a bias level that is dependent on the analog input signal and, in particular, the amplified signal from the amplifier 40. The circuit 52 receives the signal generated by the amplifier 40 and configures the auto-bias signal in response to a shift in the bias level downward by a predetermined amount, thereby permitting a comparison within the comparator 44 between the amplified signal and a signal similar to the amplified signal but at a lower DC level. The bias selection circuit 54 is configured to output one of the linear and auto-bias signals and deliver that signal to the comparator 44 as the bias signal. The circuit 54, which may comprise one or more switches, selects one of the linear and auto-bias signals responsive to a control signal from the controller 102.

The controller 102 is provided to decode messages received from the power line 18 and to encode messages for transmission on the power line 18. The controller 102 may further be provided to perform a variety of actions in response to received messages depending on the purpose of the system 20, 22 in which the controller 102 is employed. For example, the controller 102 can be used to detect the start and end of a single PLC message, identify the preamble and data sections of the PLC message, and perform encoding. In one embodiment, the controller 102 comprises a memory, one or more processors, and an input/output (I/O) interface including a plurality of input/output pins or terminals through which the controller 102 may receive a plurality of input signals and transmit a plurality of output signals. The input signals may include signals received from the signal conditioning circuit 26 while the output signals may include signals transmitted to the power line 18 through, for example, a corresponding signal conditioning circuit that converts the digital output signals from the controller 102 to analog output signals.

In the illustrated embodiment, a single controller 102 is shown. It should be understood, however, that the functionality of the controller 102 described herein may be divided among multiple sub-controllers. Further, the controller 102 can be configured with appropriate programming instructions (i.e., software, firmware, a computer program) to implement the method described herein. The controller 102 can also take the form of a pure-hardware configuration using processing circuitry, logic gates, switches, an application-specific integrated circuit (ASIC), or a programmable logic controller, for example.

One use of this system is to perform auto-calibration of PLC signal level, as described in U.S. patent application Ser. No. 17/948,632, which is incorporated herein by reference. Such auto-calibration can address the problem of signal attenuation caused by the long power lines used in a tractor-trailer.

Figure 3:
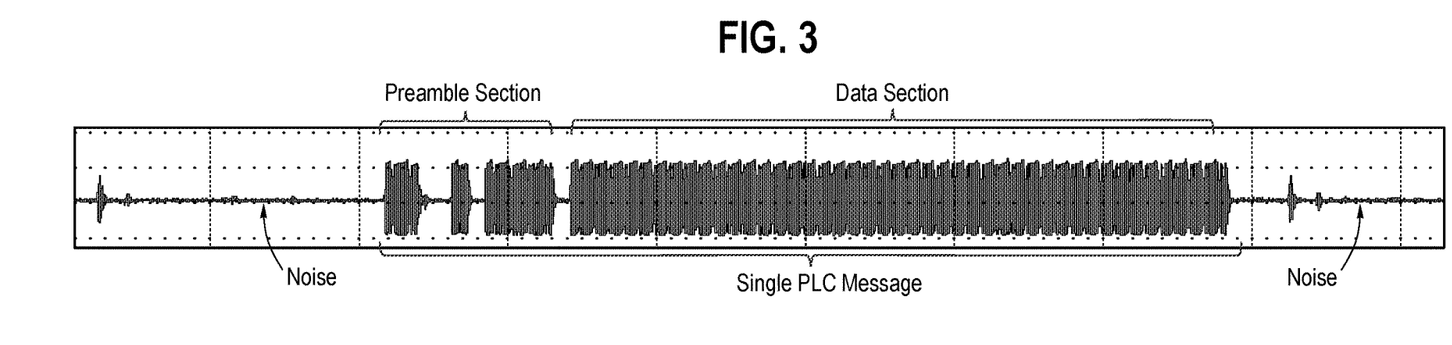
FIG. 3 is an illustration of a power line communication (PLC) message of an embodiment.
Figure 4:
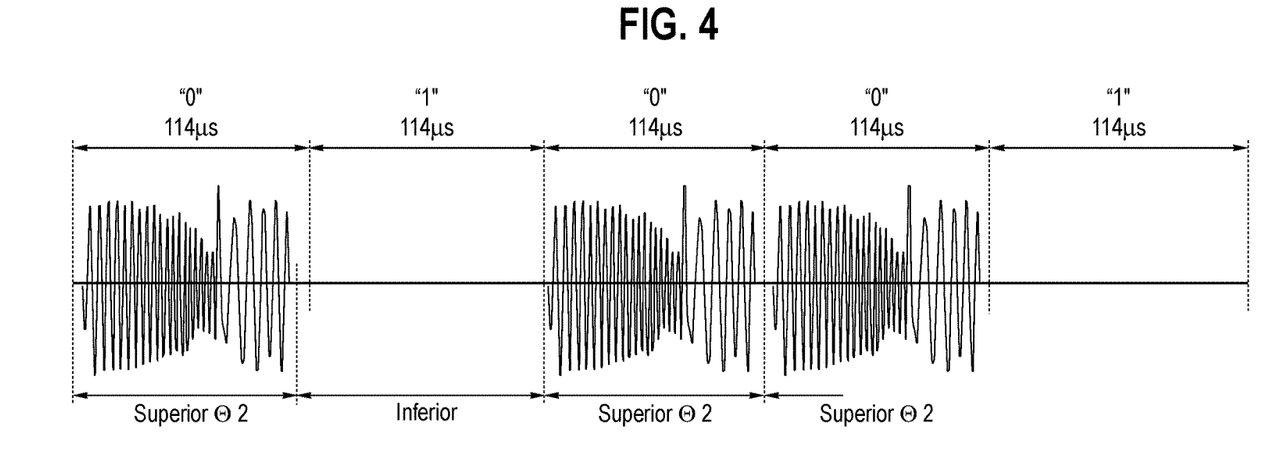
FIG. 4 is an illustration of a preamble section of a PLC message of an embodiment.
Figure 5:
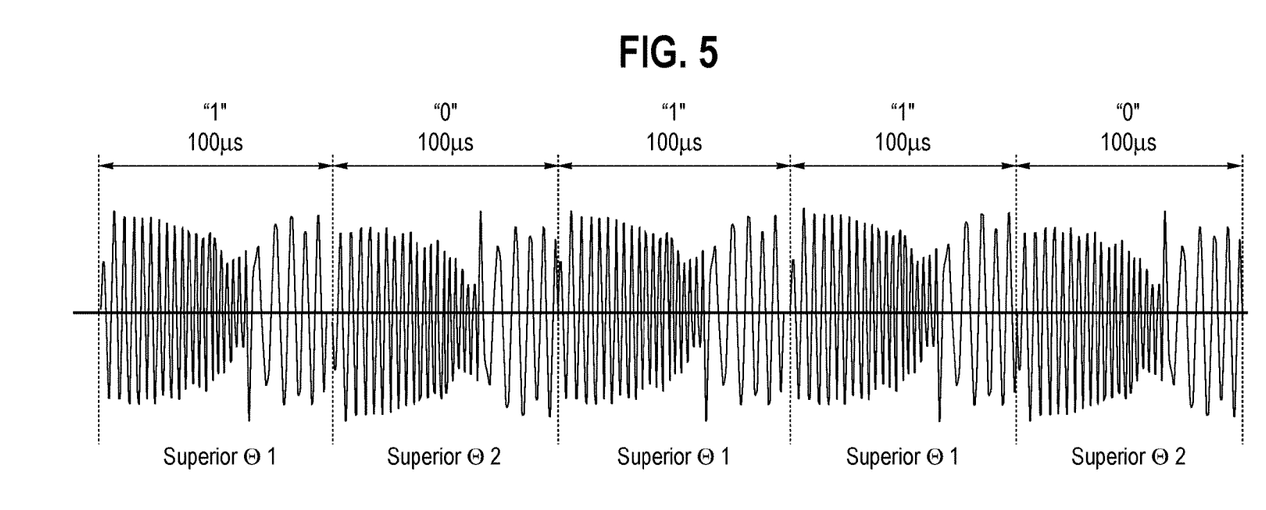
FIG. 5 is an illustration of a data section of a PLC message of an embodiment.

Turning again to the drawings, FIG. 3 is an illustration of a single PLC message of an embodiment. As shown in FIG. 3, this message comprises a preamble section and a data section, examples of which are shown in FIGS. 4 and 5, respectively. As shown in FIG. 4, in the data body, the "0" bit (or SUPERIORΘ2 signal chirp) and the "1" bit (or SUPERIORΘ1 signal chirp) are the same but out-of-phase by 180 degrees. A single SUPERIORΘ1 or SUPERIORΘ2 signal chirp of the preamble and data section is called a "symbol." In the data section, the length of a symbol is 100 microsecond (µs) (plus or minus 0.5%) as per the SAE J2497 standard.

The circuit 26 can detect the start and end of a single PLC message and then perform post-processing by identifying the preamble and data sections. In a noisy environment, the data section may be degraded due to the noise coming from the vehicle's engine and/or from other controllers connected to the same power line 18 (e.g., +12 V power line) of the vehicle harness. (In some situations, the power line 18 can be more than ten meters long depending on the number of trailers used, and multiple controllers may be used on the same+12V power line.) FIG. 3 shows an example of such noise, which can degrade the performance of PLC signal detection.

The following embodiments can be used to address this noise problem. Referring back to FIG. 2, in one embodiment, a differential phase detection system 100 is provided comprising a differential phase detector 110, a delay and clock module 120, and a module 130 (e.g., memory) that holds the output of the differential phase detector 110 and updates it periodically (e.g., every 100 µs). The differential phase detection system 100 can be implemented in any suitable way. For example, in one implementation, the differential phase detector 110 and module 130 are implemented using a hardware shift register. One example of a hardware shift register is a flip-flop (e.g., a D flip-flop), but other types of flip-flops and hardware shift registers can be used. Also, instead of being implemented in hardware, the differential phase detection system 100 can be implemented in software. Of course, these are merely example implementations, and other implementations can be used.

The differential phase detection system 100 can be used in conjunction with the signal conditioning circuit 26. More specifically, as shown in FIG. 2, the differential phase detection system 100 receives, as its input, a signal from PLC preamplifier 36 and provides an output to the controller 102.

In general, this embodiment takes advantage of the fact that the "0" bit (SUPERIORΘ2 signal chirp or symbol) and the "1" bit (SUPERIORΘ1 signal chirp or symbol) in the data body are the same but out-of-phase 180 degrees. The differential phase detection system 100 can be used to compare the phase of a given data section with the phase of a previous data section (instead of processing all the data in a big chunk) and provide a simple logic '0' (low) or logic '1' (high) signal to the controller 102 to indicate whether the phase of the current and previous data sections is the same or different. For example, if the phase of the data section of the current signal at time=t and the phase of the data section of the previous signal at time=(t−100)µs is the same, the differential phase detection system 100 can output a logic '0' to the controller 102. Conversely, if the phase of the data section of the current signal at time=t and the phase of the data section of the previous signal at time=(t−100) µs is different, the differential phase detection system 100 can output a logic '1' to the controller 102. Detecting the phase difference rather than detecting the data itself provides great immunity to noise.

Figure 6:
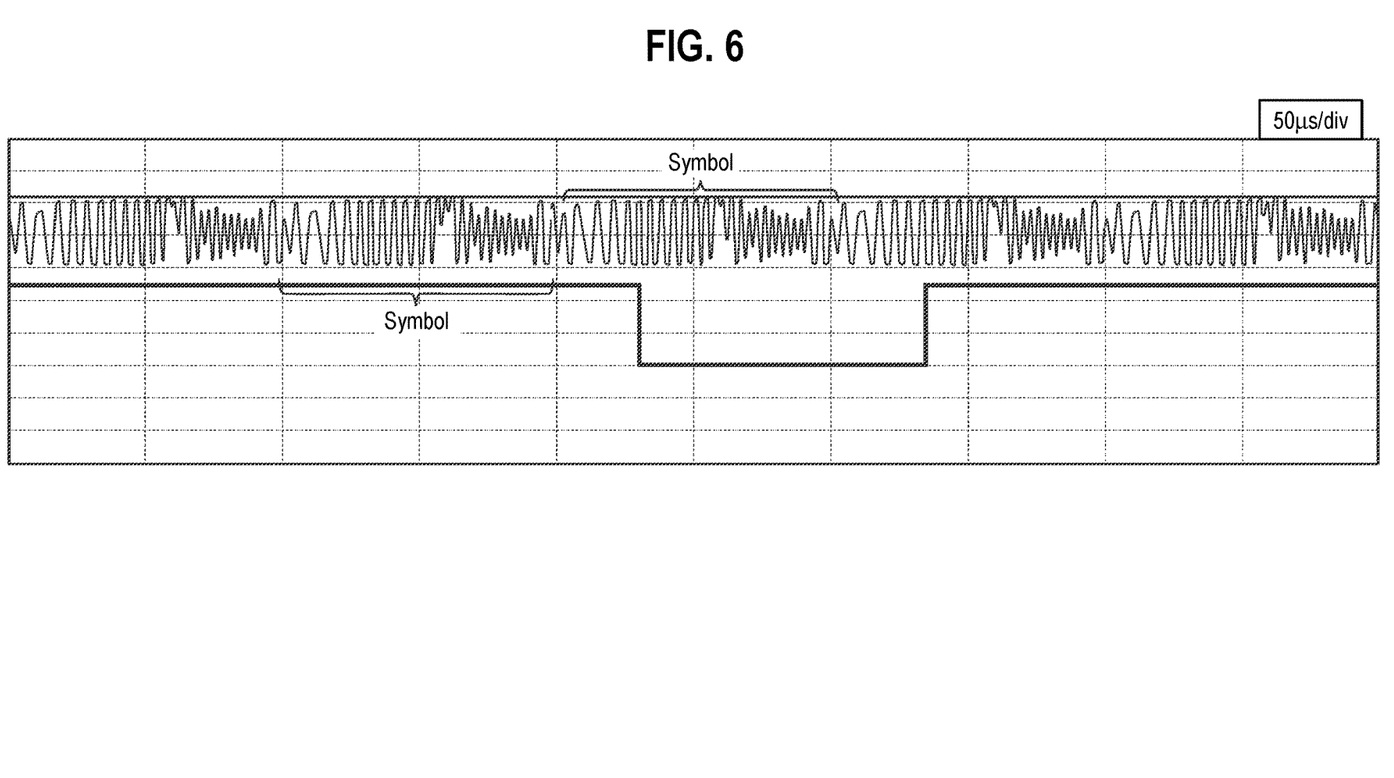
FIG. 6 is an illustration of differential phase detection of a data section of a PLC message of an embodiment.

So, rather than encoding the actual data bit based on its signal shape and timestamp, the phase of a symbol relative to a previous symbol is detected in this embodiment. This can be achieved by sampling each symbol of the data body with a sampling rate of 100 µs in this example (other time periods can be used in other examples). The sampling can occur in any section of the data body as long as the next sampling time is 100 µs apart. This is illustrated in FIG. 6, which shows about five symbols of a data section, where the horizontal scale is 50 µs/div and each symbol is 100 µs long. The differential phase detection system 100 is used to compare the phase (state) of the current symbol to the phase (state) of the previous symbol. If they are the same, the differential phase detection system 100 outputs a logic '0' to the controller 102. If they are different, the differential phase detection system 100 outputs a logic '1' to the controller 102.

Figure 7:
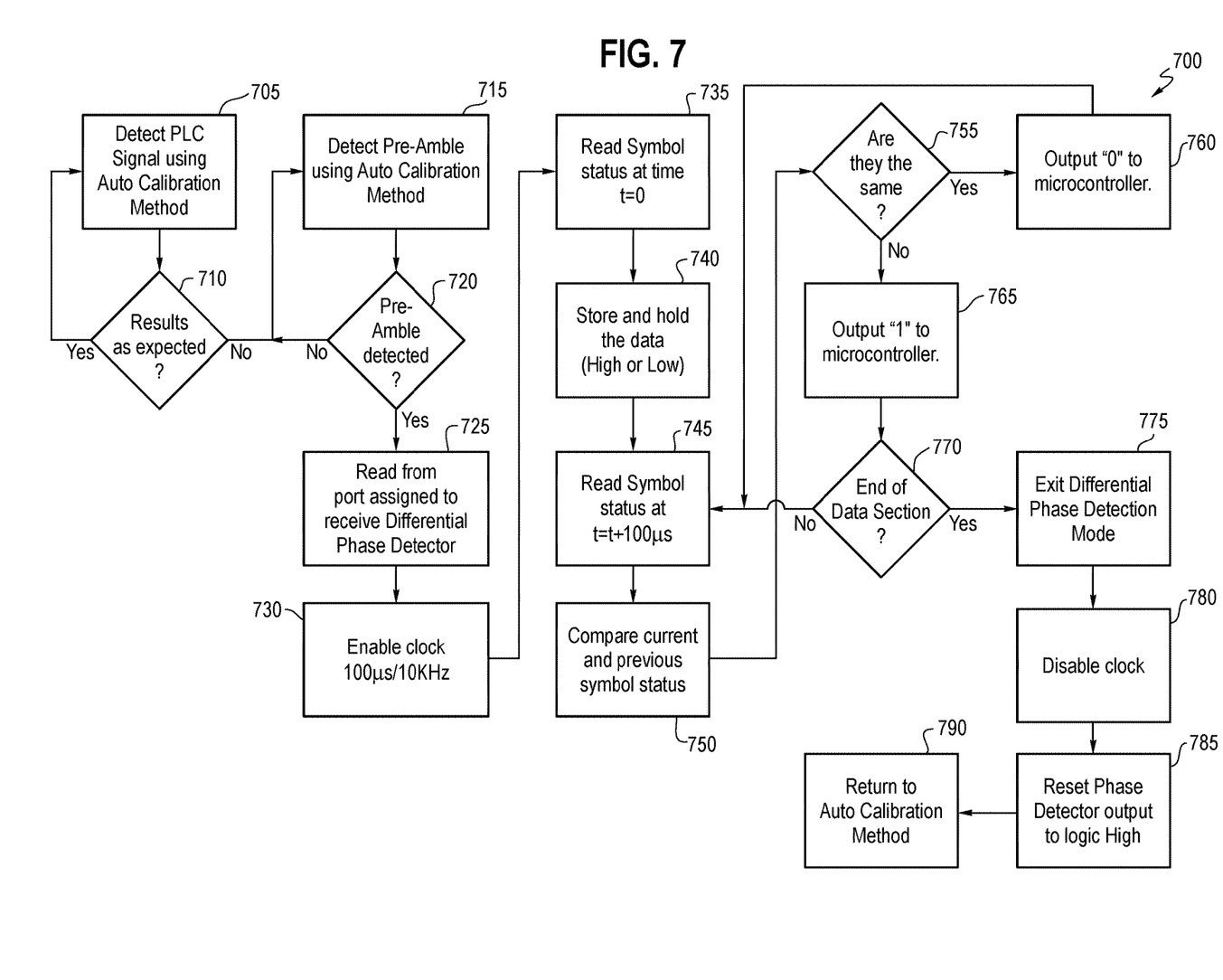
FIG. 7 is a flow chart of a method of an embodiment for differential phase detection of a data section of a PLC message.

Returning to the drawings, FIG. 7 is a flow chart 700 of a method of an embodiment for differential phase detection. As shown in FIG. 7, first, the circuit 26 detects the PLC signal using an auto-calibration method (act 705). Then, it is determined whether the results are as expected (act 710). If the results are as expected, the method loops back to act 705. If the results are not as expected, the circuit 26 detects the signal's preamble using the auto-calibration method (act 715), and it is then determined whether the preamble was detected (act 720). If the preamble was not detected, the method loops back to act 715. If the preamble was detected, the differential phase detection system 100 reads from a port of the circuit 26 that is assigned to the differential phase detector 100 (act 725). The clock 120 of the differential phase detection system 100 is then enabled by the controller 102 at 100 µs (i.e., 10 KHz) (act 730). The differential phase detection system 100 then reads the symbol status at time t−0 (act 735), stores and holds the data (high or low) in module 130 (act 740), reads the symbol status at t=(t+100)µs (act 745), compares the current and previous system statuses (act 750), and then determines if the statuses are the same (act 755). If the statuses are the same, the differential phase detection system 100 outputs a logic "0" to the controller 102 (act 760). If the statuses are not the same, the differential phase detection system 100 output a logic "1" to the controller 102 (act 765). It is then determined whether the end of the data section has been reached (act 770). If the end of the data section has not been reached, the method loops back to act 745. If the end of the data section has been reached, the differential phase detection system 100 exits the differential phase detection mode (act 775), disables the clock 120 (act 780), resets the phase detector output in module 130 to logic high (act 785), and returns to the normal auto-calibration method (act 790).

In summary, this embodiment detects the preamble section and decides whether to continue to read the data section using the existing method or to use the differential phase detector circuit 100. For example, the controller 102 can determine whether the noise present in the signal is above a threshold. If the detection of the PLC signal is not good enough after executing the auto-calibration method (e.g., PLC detection is less than 50%), the controller 102 can change its PLC detection by only monitoring the preamble section. The data section would be monitored by the differential phase detection system 100. The controller 102 would read the preamble section from the existing input port coupled with the auto-calibration circuit 26 and would read the differential phase information from the input port coupled with the output of the differential phase detection system 100. The differential phase detection system 100 handles differential phase detection and provides the controller 102 with a logic 1 or 0 every 100 μs depending on the detected phase of the data section of the PLC message. The symbol state can be sampled at any part of the symbol as long as the next detection is 100 μs apart (again, 100 μs is used in this example, but different time periods can be used in other examples). The clock to the differential phase detection system 100 can be enabled or disabled by the controller 102 via a software configuration. Once the PLC "end of message" is detected, the controller 102 can stop the clock and reset the PLC detector's output circuit to logic high.

There are many benefits associated with these embodiments. For example, because detection is done by hardware (the differential phase detection system 100) and not by software in the controller 102, there is less processing demand on the controller 102. Also, these embodiments provide superior immunity to noise on the power line 18 of the vehicle harness as compared to normal detection. Further, because the differential phase detection system 100 can be used as an "add-on" to the auto-calibration and signal leveling circuitry 26, no changes are needed to the circuitry 26, nor are changes needed to the controller 102 to detect the preamble and data sections. The controller 102 merely receives another input (from the differential phase detection system 100), which can be used by the controller 102 as needed to detect the data section and provide immunity to noise on the power line 18.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A system comprising:
    a controller;
    circuitry coupled with the controller and configured to detect a data section of a power line communication (PLC) message, wherein the data section comprises a plurality of logic 0 and logic 1 symbols that are 180 degrees out-of-phase with each other; and
    a differential phase detection system coupled with the circuitry and the controller, wherein the differential phase detection system is configured to:
        read phases of two adjacent symbols in the data section;
        determine whether a phase difference exists between the phases of the two adjacent symbols; and
        provide an output to the controller regarding whether the phase difference exists;
    wherein the PLC message further comprises a preamble section, and wherein the controller is configured to enable the differential phase detection system to read the phases of the two adjacent symbols in the data section in response to noise in the preamble section exceeding a threshold.

2. The system of claim 1, wherein the differential phase detection system is further configured to read the phases of the two adjacent symbols in the data section at a frequency set by the controller, wherein the frequency corresponds to a length of each symbol in the data section.

3. The system of claim 1, wherein the controller is configured to enable an auto calibration system to change an amplitude of a PLC emulation amplifier to read amplitudes of two adjacent symbols in the preamble section in response to noise in the preamble section exceeding a threshold.

4. The system of claim 1, wherein the phases of the two adjacent symbols in the data section are read from an output of a preamplifier in the circuitry.

5. The system of claim 1, wherein the differential phase detection system is further configured to:
    store a phase status of a first of the two adjacent symbols in a memory of the differential phase detection system; and
    store a phase status of a second of the two adjacent symbols in the memory;
    wherein the differential phase detection system is further configured to determine whether the phase difference exists by comparing the phase statuses stored in the memory.

6. The system of claim 1, wherein the differential phase detection system is further configured to read and compare phases of additional adjacent symbols in the data section until an end of the data section is reached.

7. The system of claim 1, wherein the controller is further configured to disable a clock in the differential phase detection system and reset a memory in the differential phase detection system in response to an end of the data section being reached.

8. The system of claim 1, wherein the differential phase detection system comprises:
    a differential phase detector;
    a delay and clock module; and
    a module configured to hold an output of the differential phase detector and update the output periodically.

9. The system of claim 1, wherein the circuitry comprises:
    an adjustable gain circuit configured to output an amplifier gain signal establishing an amplifier gain level; and
    an amplifier configured to output amplified signals responsive to the analog input signals and the amplifier gain signal.

10. The system of claim 1, wherein the system is located in a vehicle, and wherein the PLC message is by the circuitry received via a power line of the vehicle.

11. A method comprising:
performing in a controller in a vehicle, the controller being in communication with at least one other controller in the vehicle via a power line:
  receiving, from first circuitry, a preamble section of a power line communication (PLC) message communicated on the power line;
  determining whether a noise level in the preamble section is greater than a threshold; and
  performing at least one of:
    in response to determining that the noise level in the preamble section is not greater than the threshold, receiving, from the first circuitry, a data section of the PLC message; and
    in response to determining that the noise level in the preamble section is greater than the threshold, instead of receiving the data section of the PLC message from the first circuitry, receiving differential phase information from second circuitry, wherein the differential phase information indicates whether two symbols in the PLC message are out-of-phase with each other.

12. The method of claim 11, further comprising:
enabling a clock of the second circuitry to a frequency corresponding to a length of each symbol in the data section.

13. The method of claim 12, wherein the length of each symbol in the data section comprises 100 microseconds.

14. The method of claim 11, further comprising:
in response to detecting an end of the data section:
  disabling a clock in the second circuitry; and
  resetting an output of the second circuitry.

15. The method of claim 11, wherein the first circuitry comprises a signal conditioning circuit and the second circuitry comprises a differential phase detector.

16. A system comprising:
means for determining whether a noise level in a preamble section of a power line communication (PLC) message communicated on a power line of a vehicle is greater than a threshold; and
means for, in response to determining that the noise level is greater than the threshold, detecting phase differences in signal chirps in a data section of the PLC message.

17. The system of claim 16, wherein the means for detecting comprises a differential phase detection system.

18. The system of claim 16, wherein the means for determining whether the noise level is greater than the threshold comprises a controller.

19. The system of claim 16, further comprising means for detecting the preamble section.

* * * * *